FREQUENCY ERROR COMPENSATION IN F. M. SYSTEMS

Filed May 12, 1955

4 Sheets-Sheet 1

INVENTOR.
W. H. Chester
BY
ATTORNEY

FREQUENCY ERROR COMPENSATION IN F. M. SYSTEMS

INVENTOR.
W. H. Chester
BY
ATTORNEY

June 24, 1958 W. H. CHESTER 2,840,800

FREQUENCY ERROR COMPENSATION IN F. M. SYSTEMS

Filed May 12, 1955 4 Sheets-Sheet 3

INVENTOR.
W. H. Chester

BY

E. Woodbury
ATTORNEY

INVENTOR.
W. H. Chester
BY
[signature]
ATTORNEY 2,840,800
Patented June 24, 1958

1

2,840,800

FREQUENCY ERROR COMPENSATION IN F. M. SYSTEMS

William H. Chester, North Hollywood, Calif., assignor to Bendix Aviation Corporation, North Hollywood, Calif., a corporation of Delaware Application May 12, 1955, Serial No. 507,850

8 Claims. (Cl. 340—174)

This invention relates to FM telemetric and instrumentation systems and is particularly useful in systems of that type in which signals are stored on and subsequently reproduced from a record such as a magnetic tape or the equivalent. Whenever a signal is recorded and subsequently reproduced, error frequency shifts are unavoidably introduced unless the recording and playback speeds are exactly the same. Such frequency errors are commonly referred to as "wow" and "flutter."

An object of the invention is to provide an effective and practicable compensation system for reducing the effects of frequency errors. In the past, the use of magnetic tape and similar information storage techniques in frequency modulation instrumentation and telemetering has been limited because of the errors introduced. The present invention permits reduction of these errors to a value that is negligible when compared to channel and/or system information handling capacity.

A feature of the invention is the compensation of frequency shift errors in an FM telemetering system employing discriminators of the pulse type, by varying the area of the signal-initiated pulses in inverse ratio to the errors. An advantage of this feature is that the correction is made ahead of the output low pass integrating filters, so that the time delay characteristics of the latter need not be compensated for. Additional advantages are that there is no loss of signal strength, and the error correction is more exact.

Other more specific objects and features of the invention will appear from the description to follow.

In an FM telemetering system employing, for recovery of the information signals, frequency discriminators of the pulse type, the received variable frequency signal wave is caused to produce a train of square-topped pulses of constant height and width but spaced apart in accordance with the frequency of the wave, and the signal is then recovered by integrating the train of pulses with a low pass filter. In such systems, it has been the practice to compensate for error frequency shifts by transmitting, along with the signal waves, an unmodulated reference wave which is equally affected by the error shift, recovering from the reference wave a potential corresponding to the error shift only, and subtracting this potential from the recovered signal potential. That method is not entirely effective, because it is dependent upon the signal amplitude, and its practice is complicated by the fact that all the time time delays in the reference and signal channels must be taken into account and equalized.

In accordance with the present invention, the error potential recovered from the reference wave is applied to the discriminator in such a way as to vary the area of the square-topped pulses, thereby introducing the correction ahead of the low pass filter. This method is more accurate, because it is essentially independent of the signal deviation. It has the further advantage that equalization of channel delays is simplified, because of the fact that the correction is made ahead of the low pass (integrating) filter in the signal channel, so that the delay introduced by this filter need not be considered.

2

One embodiment of the invention will now be described with reference to the drawing, in which.

Figures 1, 2:
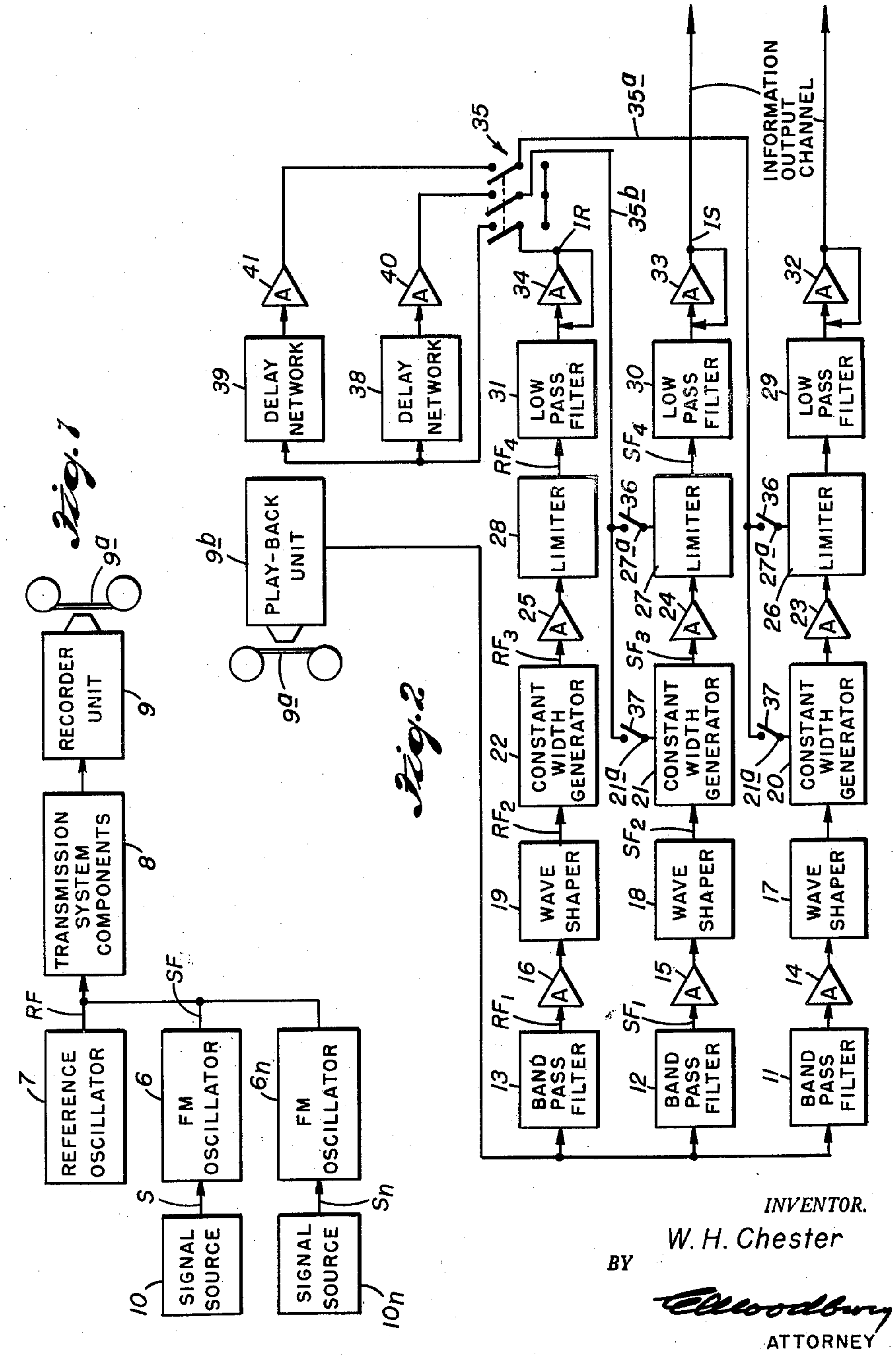
Fig. 1 is a schematic diagram of apparatus that may be used at the transmitting station of a telemetering system for recording a plurality of A. C. frequency modulated waves on a recording medium.
Fig. 2 is a schematic diagram of apparatus for recovering the record signals from the recording medium and producing therefrom output signals corresponding to the input signals that were transmitted.
Figure 6:
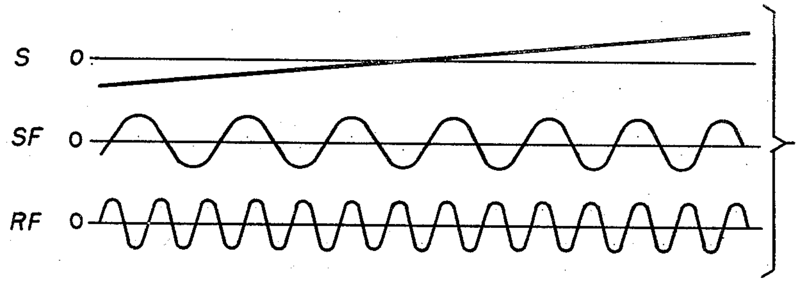
Fig. 6 is a set of graphs showing the wave forms generated in the transmitting apparatus of Fig. 1.

Referring to Fig. 1, information input signals supplied by signal sources 10, $\mathbf{10_n}$ may be physical or electrical quantities, the electrical wave form of one of which may, for example, be the linearly rising value S in Fig. 6. The wave form S frequency-modulates an oscillator 6 while some other wave form from the source $\mathbf{10_n}$ frequency-modulates an oscillator $\mathbf{6_n}$. An additional oscillator 7 is unmodulated and supplies a reference wave of constant frequency.

The output of oscillator 6 has the wave form SF in Fig. 6, and the output of the unmodulated reference oscillator 7 has the wave form RF. These waves RF and SF, together with any desired additional waves from other modulated oscillators $\mathbf{6_n}$, are transmitted over transmission system components 8 and recorded by a recording unit 9 on a recording medium shown as a tape 9*a*.

Referring to Fig. 2, the tape 9*a* is subsequently played back by a playback unit 9*b*, and the output delivered to a plurality of band pass filters 11, 12 and 13. Assuming that there are no errors introduced by the system, the input wave forms to the band pass filters are identical with those delivered to the recording unit 9 in Fig. 1.

Figure 8:
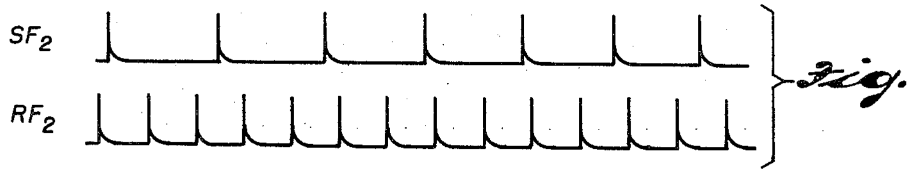
Fig. 8 is a pair of graphs showing the wave shapes at the outputs of two of the wave shapers in the system of Fig. 2.

Each band pass filter is tuned to accept the output of only one of the oscillators $6_n$, 6 or 7 in Fig. 1. Thus, the output of filter 11 is a reproduction of the output of the FM oscillator $6_n$; the output of filter 12 is a reproduction of the output of the FM oscillator 6; and the output of filter 13 is a reproduction of the output of the reference oscillator 7. These signals are separately amplified by amplifiers 14, 15 and 16 and delivered to separate wave shapers 17, 18 and 19 which limit the signals and generate trigger pulses as shown in Fig. 8. Normally, one trigger pulse is generated for each cycle and is coincident with the time of crossing the zero reference axis in positive direction, as will be observed from comparison of Fig. 8 with Fig. 6.

Figure 9:
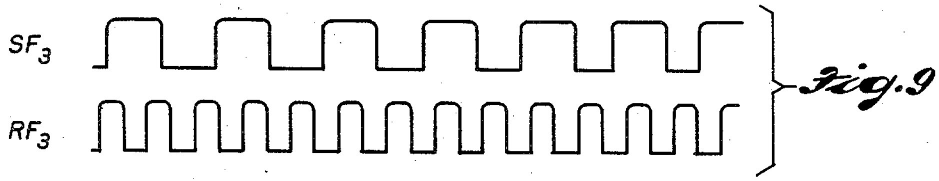
Fig. 9 is a pair of graphs showing the wave shapes at the outputs of two of the constant width generators of the system of Fig. 2.

The trigger pulses are delivered to constant width generators 20, 21, 22, which may typically be of known types variously referred to as one-shot multi-vibrators, Miller integrators, or Phantastrons. Such constant width generators have one stable and one non-stable condition, and when triggered from an external source develop an output pulse the duration of which is dependent on the circuit parameters, but is independent of the repetition rate of the triggering pulses. The pulses produced by the constant width generators in response to the triggers pulses $SF_2$ and $RF_2$ of Fig. 8 are the pulses $SF_3$ and $RF_3$, respectively, in Fig. 9.

Figure 10:
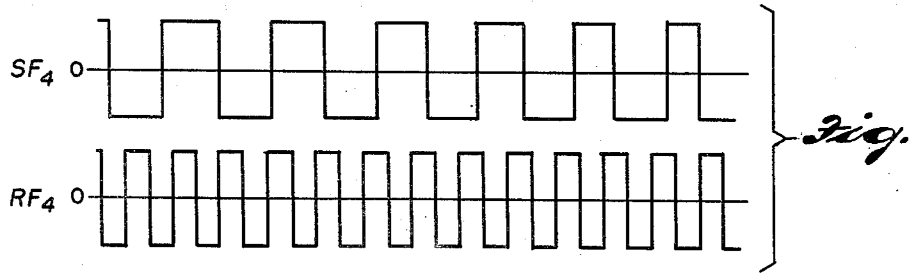
Fig. 10 is a pair of graphs showing the wave shapes at the outputs of two of the limiters in the system of Fig. 2.

The pulses $SF_3$ and $RF_3$ are amplified in amplifiers 24 and 25 and applied to limiters 27 and 28, which serve to limit the pulse amplitudes to a closely-regulated value and establish a system or ground reference such that the amplitudes of excursion are essentially equal in the positive and negative directions, as shown by the curves $SF_4$ and $RF_4$ in Fig. 10.

The limiter output signals $SF_4$ and $RF_4$ are fed to low pass filters 30, 31, respectively, which serve to integrate the power content of the pulses. The output signals of the low pass filters are positive or negative, depending on whether the positive or negative excursions of the pulses $SF_4$ and $RF_4$ contain the most energy. Thus, the output of the filter 30 is a signal proportional to the wave form S in Fig. 6, and the output signal of the filter 31 will be zero under the assumed condition of no error, since the output RF of the reference oscillator 7 is unmodulated. Since the level of signal at the outputs of the low pass filters is not usually adequate for the desired purposes, D. C. amplifiers 32, 33, 34 stabilized with negative feedback are usually included. Such amplifiers normally invert the signal polarity, thereby compensating for the inversion normally created by the amplifiers 23, 24, 25, so that the polarity at their output is identical to that of the input signal wave forms. If desired, the amplitudes of the output signals IR and IS delivered by the amplifiers 32 and 33 may be adjusted to be an exact reproduction of the input signals S and $S_n$ in Fig. 1. The output of amplifier 34 remains exactly at zero potential.

Now assume that a frequency error has been introduced in the system, as by the condition that the tape was not run through the recorder unit 9 at exactly the same speed that it was subsequently run through the playback unit 9*b*. Let it be assumed further that the playback unit 9*b* was run at a speed approximately 10% greater than the recording speed of the recording unit 9.

Figure 7:
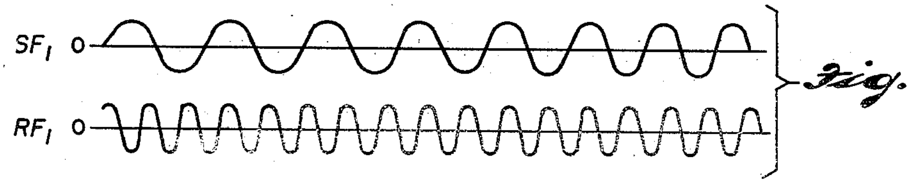
Fig. 7 is a set of graphs showing wave shapes at the outputs of two of the band pass filters of Fig. 2 when an error frequency shift is present.

Under these conditions the waves $SF_1$ and $RF_1$ delivered to the wave shapers 18 and 19, instead of being identical with the waves SF and RF delivered by the oscillators 6 and 7 at the transmitting station, are higher in frequency by approximately 10%, as shown in Fig. 7. As a result, the pulses delivered by the wave shapers 18 and 19, respectively, are more closely spaced, as shown by curves $RF'_2$ and $SF'_2$ in Fig. 11. Comparing Fig. 11 with Fig. 8, the reduced interval between the trigger pulses in Fig. 11 will be apparent.

Figure 11:
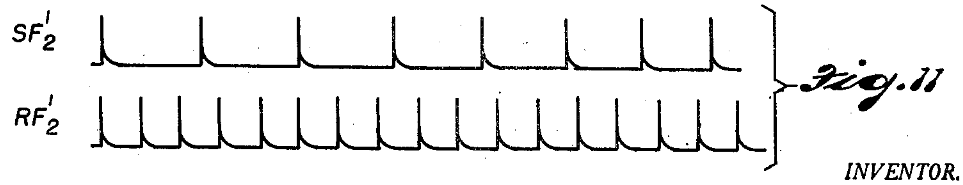
Fig. 11 is a pair of graphs similar to those of Fig. 8, but showing the wave forms when an error frequency shift is present.
Figure 12:
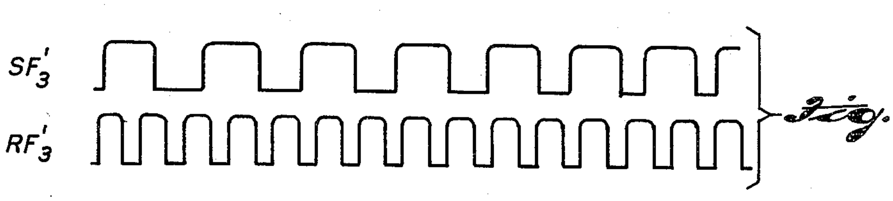
Fig. 12 is a pair of graphs similar to those of Fig. 9, but showing the wave shapes when an error frequency shift is present.

Referring to Fig. 12, it will be observed that the output pulses $RF'_3$ and $SF'_3$ of the constant width generators are also more closely spaced, but the contraction is in the negative going portions of the pulses, the positive portions having the same width as before, since they are determined by the circuit parameters and are independent of the intervals between the pulses $RF'_2$ and $SF'_2$ (Fig. 11).

Figure 13:
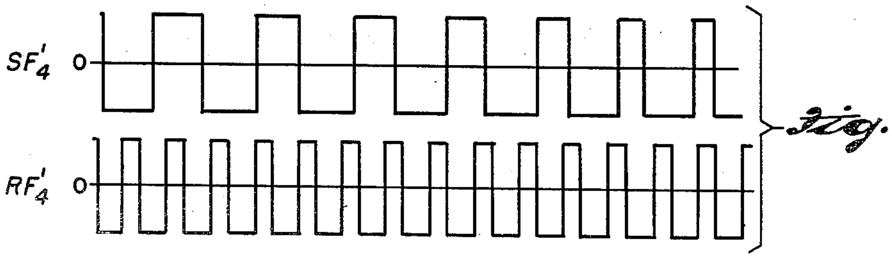
Fig. 13 is a pair of graphs similar to those of Fig. 10, but showing the wave shapes when an error frequency shift is present.

The output signals $SF'_4$ and $RF'_4$ of the limiters 27 and 28, because of the phase inversion introduced by the amplifiers 24 and 25, reflect the increase in frequency by a reduction of power in the positive going pulses, due to the reduction of their widths, as shown in Fig. 13.

After integration of the signals $SF'_4$ and $RF'_4$ in the low pass filters 30 and 31, and amplification thereof by the amplifiers 33 and 34, the wave forms of the integrated signals IS' and IR' are obtained. These wave forms are compared to the wave forms obtained when no frequency error is present, in Fig. 14. It will be observed that the output signal IS' is nearly parallel to the correct output signal IS, but is shifted in positive direction. Likewise, whereas the normal integrated ouput signal IR is zero, the signal IR' resulting from an error frequency increase has a positive value.

Figure 14:
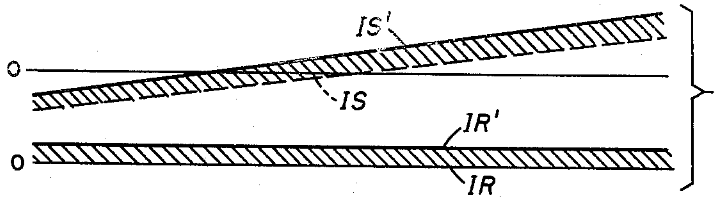
Fig. 14 is a set of graphs showing the output signals of the system of Fig. 2 under conditions of no error-shifting frequency and of error frequency shift, respectively.

It will be noted from Fig. 14 that although the curve IS' is nearly parallel to the curve IS, it is not exactly so, having a slightly increased slope. However, this increased slope does not represent an error in a typical telemetering system for the following reasons.

Output readings such as the wave IS' or the wave IS are interpreted against a time base reference signal which may be derived from the reference oscillator 7 in Fig. 1 or from an external source. This time base reference signal is mixed with the composite information signal prior to recording by the recording unit 9 on the record medium 9*a*. The time signals are subsequently recovered from the tape, and their frequency has obviously been increased by any error frequency shift identically with the information signals, such as the signal IS. Upon recovery of the information signals and comparison with the recovered time signal, it is found that the slopes of the two are identical, and error is resttricted to the D. C. shift in potential discussed above and illustrated in Fig. 14.

As shown in Fig. 14, the magnitude of the output signal IR' of the reference channel is a measure of the error frequency shift that has been introduced between the transmitter and receiver from any cause, including speed variation between the recording and playback units. It is applied, in accordance with the invention, to the signal channels in such a way as to compensate for the effect on the integrated signals of the error frequency shift. The correcting signal IR' may be applied to either the constant width generators 20, 21 or the limiters 26, 27, or both, by actuating switches 35, 36, 37.

In a typical application in which the required information frequency response is relatively low, switch 35 may be closed in its lower position delivering the output IR' of amplifier 34 directly to conductors 35*a* and 35*b*; and switches 36 may be actuated to connect conductors 35*a* and 35*b* to terminals 27*a*, 27*a*, of the limiters 26 and 27, respectively, thereby applying the integrated error signal from the reference channel to the limiters in the signal channels.

Figure 3:
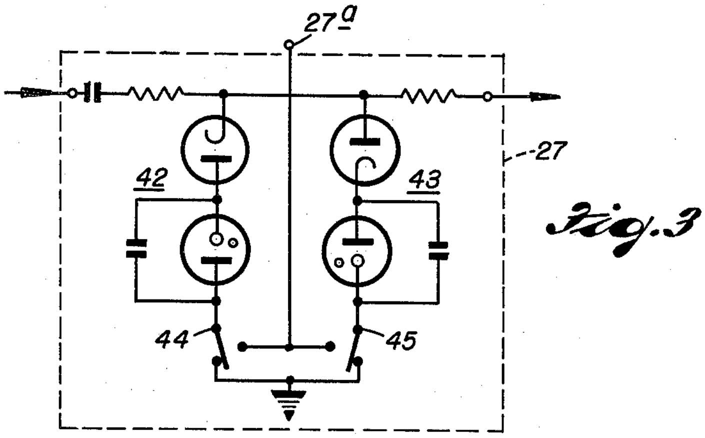
Fig. 3 is a schematic diagram of a limiter circuit that may be employed in the system of Fig. 2.

As shown in Fig. 3, a known limiter circuit that may be employed comprises input and output terminals interconnected by a condenser and two resistors in series and with a pair of oppositely poled unidirectional potential-limiting paths 42 and 43 normally connecting the junction of the two resistors to ground (or other conductor of reference potential). Each path 42 and 43 offers a high resistance below and a low resistance above a predetermined potential, and if both paths are completed to ground through the switches 44, 45, the positive and negative excursions of the output pulses are equal. On the other hand, if the positive potentail IR′ is applied to the lower end of the path 42 by switch 44, the negative excursions of the pulses $SF_4$ are further limited to the extent of the shaded areas in Fig. 15, so that the integrated signal IS″ is restored to its proper level corresponding to the correct signal IS, as shown in Fig. 16. As previously explained, the difference in slope between curves IS″ and IS does not introduce an error.

In the example described, the negative pulses (Fig. 15) are clipped because the amplifier 24 (Fig. 2) is assumed to be of a type that reverses the phase of the output of the constant width generator 21. If the circuit is such that no phase inversion occurs between the constant width generator and the limiter, the positive pulses should be extended instead of the negative pulses being clipped. Such extension of the positive pulses is obtained by actuating switch 45 to connect the lower end of path 43 to the terminal **27*a*, leaving the lower end of path 42** connected to ground.

In another mode of operation of the invention, switches 36 are open and switches 37 are closed to feed the output signal from the reference channel amplifier 34 to the constant width generators 20, 21. As previously noted, these generators may be of the types known to the art as one-shot multivibrator, Miller integrator, Phantastron, or any other in which pulse width is dependent on circuit parameters including electrode supply potentials.

Figure 4:
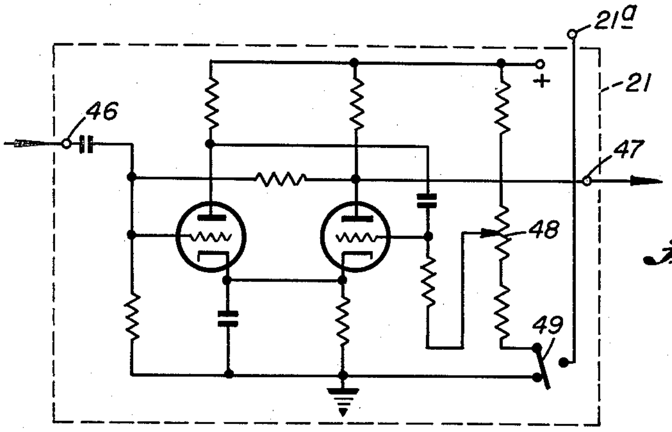
Fig. 4 is a schematic diagram of a typical constant width generator circuit that may be employed in the system of Fig. 2.

Fig. 4 shows a typical one-shot multivibrator in which trigger pulses are injected at a terminal 46, and output pulses of constant width appear at terminal 47. Pulse width may be controlled by a potentiometer 48 and by a potential injected at the lower end of the potentiometer. The output of amplifier 34 is injected by actuating a switch 49 which transfers the lower end of potentiometer 48 from connection to ground to connection through terminal **21*a* and switch 37 to the conductor 35*a* or 35*b***.

Figure 5:
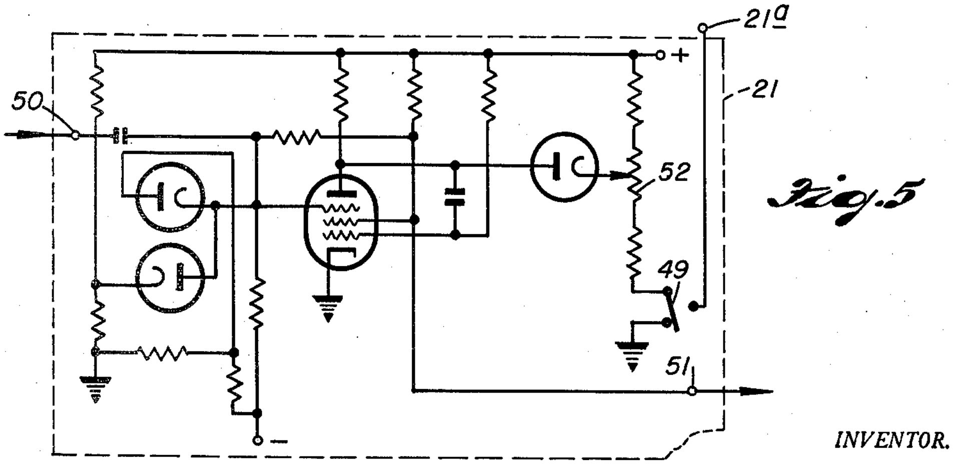
Fig. 5 is a schematic diagram of another type of constant width generator that may be employed in the system of Fig. 2.

Fig. 5 shows a self-gating Phantastron circuit that can be substituted for the circuit of Fig. 4. In this circuit, positive going input trigger pulses applied to terminal 50 serve to produce output pulses of constant width at terminal 51. Pulse width may be controlled by a potentiometer 52 and by a potential injected at the lower end thereof.

With this mode of operation, the amplifier 34 is of a type that does not reverse the polarity, so its output signal is of negative polarity but is otherwise identical to wave form IR′ (Fig. 14). When this signal is fed to the constant width generators 20, 21 over terminals **21*a* and switches 49 of Fig. 4 or Fig. 5, it serves to control the width of the pulses fed to amplifiers 23, 24 (Fig. 2). Since the function is the same in both channels, only the channel with the input signal S will be described. In this channel, the output wave form of generator 21 is modified to that of wave form $SF''_3$ shown in Fig. 17, the shaded areas indicating the portions that are, in this example, subtracted from the constant pulse width. After passing through amplifier 24 (which inverts the polarity) and limiter 27, the signal has the wave form $SF''_4$ shown in Fig. 18, with the shaded portion illustrating the area that has been subtracted from the constant width negative going pulses. After passing through low pass filter 30 and amplifier 33**, the output wave form IS″ of Fig. 16 is obtained.

Figure 15:
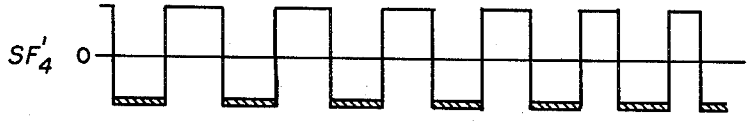
Fig. 15 is a graph showing correction of frequency error in a limiter.
Figure 16:
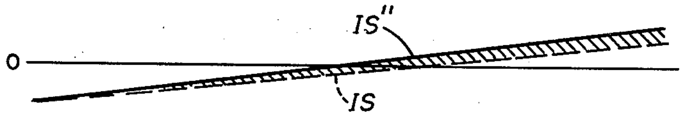
Fig. 16 is a graph comparing the input signal of Fig. 6 with the resultant output signal after subjection to error frequency shift and correction thereof.
Figure 17:
Fig. 17 is a graph showing correction of frequency error in a constant width generator.
Figure 18:
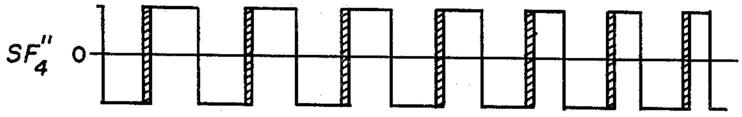
Fig. 18 is a graph showing the effect on the wave shape at the output of the limiter of the correction shown in Fig. 17.

It has been proved mathematically and confirmed by test that the correction resulting from varying the pulse width, as illustrated in Figs. 17 and 18, produces the same end result (shown in Fig. 16) as the amplitude correction illustrated in Fig. 15.

Another mode of operation of the invention is provided when relatively higher information frequency response is desired. For this mode, switch 35 is closed in its upper position, feeding the signal from the reference channel amplifier 34 to delay networks 38, 39. These networks may be of low pass filter, delay line or any other appropriate configuration that will give constant delay for the ranges of frequencies extending up to the maximum frequency expected in the related channel. The delay of each network is chosen to compensate for the delays in the signal channel with which it is associated. The delay through the reference channel including network 38 and amplifier 40 is then identical with the delay in the signal channel band pass filter 12 through limiter 27, and the delay through the reference channel including network 39 and amplifier 41 is identical with the delay in the signal channel band pass filter 11 through limiter 26. Amplifiers 40 and 41 permit adjustment of control signal amplitudes and the provision of convenient source impedances. The outputs of the amplifiers 40, 41 are delivered through the switch 35 to the conductors **35*a*, 35*b***.

An upward, constant, error frequency shift was chosen for illustration of the invention only because it simplified the wave forms used to explain the operation. In practice, the error frequency shifts are usually alternately upward and downward, and vary rapidly. Rapid error variations in frequency produce objectionable phase delays in the signal channels, just the same as do rapidly changing signals, and may necessitate the use of the compensating delay networks 38 and 38, even though the original signals S, $S_n$ change relatively slowly.

It is to be understood that, although to simplify the drawing a system comprising only two signal channels and one reference channel has been described, any number of signal channels may be employed in conjunction with a single reference channel. In practice, the number of signal channels may be very large.

Although for the purpose of explaining the invention a particular embodiment thereof has been shown and described, obvious modifications will occur to a person skilled in the art, and I do not desire to be limited to the exact details shown and described.

I claim:

1. In a frequency modulation signaling system subject to error frequency shifts: means for transmitting an A. C. signal wave of one base frequency and frequency—modulated with a signal, and an A. C. reference wave of a second base frequency; means for receiving said signal and reference waves and separating them; means for detecting said separated reference wave and producing therefrom an output error potential proportional to departures of the received reference wave from its base frequency; and signal-detecting means responsive to both said separated signal wave and said error potential for producing an output signal potential proportional to departures of the signal wave from its base frequency, and inversely proportional to said error potential; whereby frequency shift errors common to said signal and reference waves are reduced in the output of said signal-detecting means.

2. Apparatus according to claim 1 in which said signal-detecting means comprises: means responsive to said A. C. signal wave for generating a series of power pulses of amplitude and duration independent of the signal wave, but spaced apart in inverse relation to the frequency of the signal wave whereby the integrated energy content of the pulses is proportional to the frequency of the wave; pulse control means responsive to a potential applied thereto for varying the power content of said pulses; and means for applying said error potential to said pulse control means in such phase as to vary the energy content of said pulses in inverse ratio to the value of the error potential.

3. Apparatus according to claim 2 in which said pulse control means varies the duration of said pulses.

4. Apparatus according to claim 3 in which said pulses are substantially square, whereby variation of their length linearly varies the energy content thereof.

5. Apparatus according to claim 2 in which said pulse control means varies the amplitude of said pulses.

6. Apparatus according to claim 5 in which said pulses are substantially square whereby variation in the amplitude produces a linear variation in the energy content thereof.

7. Apparatus according to claim 2 in which: said means for separating said signal and reference waves comprises separate filter means having different time delay characteristics; and said means for detecting said reference wave and producing therefrom said error potential includes auxiliary time delay means for equalizing the time delay in the error potential applied to said pulse control means with respect to the time delay in the signal wave applied to said pulse generating means.

8. Apparatus according to claim 1 in which said signal detecting means comprises pulse generating means for generating a series of power pulses and integrating means for integrating said power pulse to produce said output signal potential; said pulse generating means being directly responsive to said separated signal wave and inversely responsive to the magnitude of said error potential whereby frequency shift errors common to said signal and reference waves are reduced in the output of said pulse generating means prior to integration of said output by said integrating means.

References Cited in the file of this patent

UNITED STATES PATENTS

| | | |
|---|---|---|
| 2,668,283 | Mullin | Feb. 2, 1954 |
| 2,685,079 | Hueppner | July 27, 1954 |
| 2,713,677 | Scott | July 19, 1955 |

Notice of Adverse Decision in Interference

In Interference No. 90,777 involving Patent No. 2,840,800, W. H. Chester, Frequency error compensation in F.M. systems, final judgment adverse to the patentee was rendered March 23, 1961, as to claims 2, 3, 4, 7, and 8.

[*Official Gazette May 2, 1961.*]